April 16, 1957   F. B. PFEIFFER   2,788,626
APPARATUS FOR WORKING SHEET MATERIAL
Filed Aug. 16, 1952   3 Sheets-Sheet 1

INVENTOR.
FRED B. PFEIFFER
BY
Morrison, Kennedy & Campbell
ATTY-

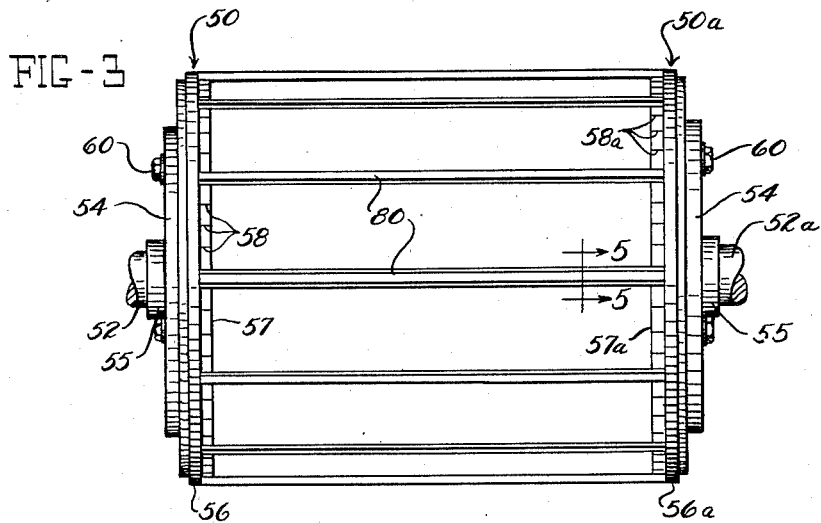
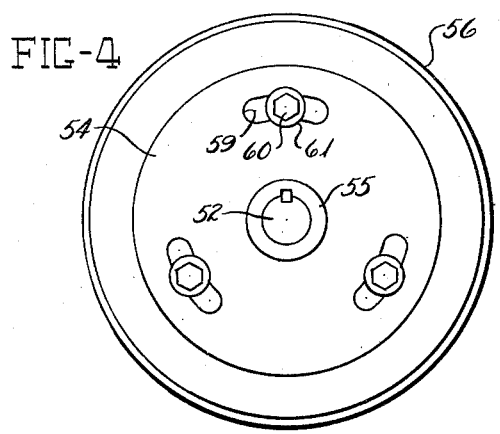
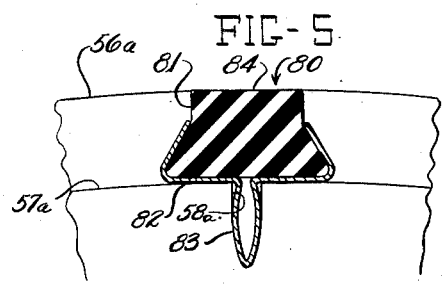
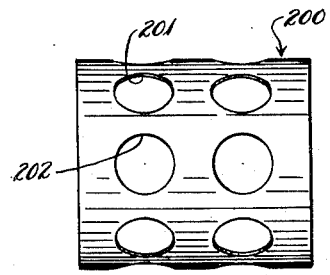
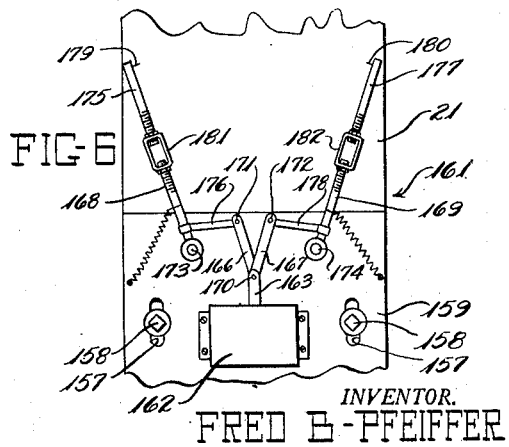
INVENTOR.
FRED B. PFEIFFER

April 16, 1957     F. B. PFEIFFER     2,788,626
APPARATUS FOR WORKING SHEET MATERIAL
Filed Aug. 16, 1952     3 Sheets-Sheet 3

*INVENTOR.*
FRED B. PFEIFFER
BY
MORTON, Kennedy + Campbell
ATTY-

United States Patent Office 2,788,626
Patented Apr. 16, 1957

2,788,626
APPARATUS FOR WORKING SHEET MATERIAL
Fred B. Pfeiffer, Akron, Ohio, assignor of one-half to Jesse R. Crossan
Application August 16, 1952, Serial No. 304,819
19 Claims. (Cl. 53—180)

This invention relates to novel apparatus for wrapping articles. The invention carries forward the broad inventive concept disclosed in my Patent 2,486,768, dated November 1, 1949, and it adds thereto certain steps and features of machine construction and operation having practical importance.

The invention contemplates wrapping or packaging either partly or completely various objects with a film or sheet of such a nature as to be capable of conforming to any desired shape to accommodate the object, article or material being wrapped or packaged. In some practices of the invention such film or sheet material is preferably moistureproof and impermeable to air and other gases and is heat sealable, that is, capable of having engaging portions fused when heated. One such material which is suitable for practicing the invention and which is commercially available is a rubber hydrochloride, manufactured by the Goodyear Tire and Rubber Company of Akron, Ohio, under the trade name of "Pliofilm," such material being more specifically described in the Calvert Patent No. 1,989,632 of January 29, 1935.

One feature of the invention contemplates heating appropriate strips of wrapping material in such a manner as to reduce the thickness of such strips without a substantial decrease in the width or surface area of said strips.

Another feature of the invention is the provision of a film heating surface over which the film passes, said surface being so designed as to prevent the heat softened film from adhering thereto.

Still another feature of the invention is the provision for supplying strips of film or wrapping material to a packaging station in a heated and softened condition suitable for a stretch-wrapping packaging operation and the provision of sealing means adapted to operate on restricted areas of the film or wrapping material whereby to fuse said film or wrapping material to partly or completely enclose an object, article or material being wrapped in said film or wrapping material and to secure the film or wrapping material about said object, article or material, and the provision of means for adjusting said sealing means laterally and longitudinally of said strips to accommodate strips of various widths and various sizes of objects, articles or bulk of material being packaged.

Another feature of the invention is the provision in a wrapping machine for relative adjustment of its operational parts with their supports so that the machine may be operated in a horizontal, perpendicular or any angular position desired.

A still further feature of the invention is the provision of means for regulating the area of heating rolls surface with which the film or wrapping material makes contact.

Another feature of the invention is the provision of a wrapping machine having a pair of spaced side members between and on which a pair of cooperating wrapping station rolls are supported, one of said side members being movable laterally away and toward the other side member whereby pairs of said wrapping station rolls of different sizes may be substituted one for another to accommodate various size objects, articles or bulk materials being packaged.

Another feature of the invention is the steps in a continuous stretch-wrapping operation of heating a strip of thin thermoplastic material, by passing it over a heated roll, to a temperature that makes the said material stretchable and heat-sealable with numerous small adjoining areas of the strip being heated to different temperatures whereby the cooler areas resist rupturing of the strip when being removed from the heater roll and provides means for removing the adjoining hotter and softer areas of the strip from the roll; and leading the heated strip to a wrapping station permitting a sufficient lapse of time of travel of strip between the heating roll and the wrapping station for the strip to substantially equalize the temperatures of said adjoining areas and thereby present a substantially uniformly heated strip at the wrapping station.

The foregoing and other objects and features and advantages of the invention will be readily appreciated from the following description, in connection with the accompanying drawings, wherein one form of the invention has been shown by way of illustration, and wherein:

Figure 3 is a front view of one of a pair of members of a wrapping and sealing station;

Figure 4 is an end view of the member of Figure 3 taken from the right side thereof;

Figure 5 is a sectional view taken in line 5—5 of Figure 3;

Figure 6 is a view of severing mechanism;

Figure 7 is a front view of one of a pair of members which may be substituted for the wrapping and sealing station shown in Figure 3;

Figure 1:
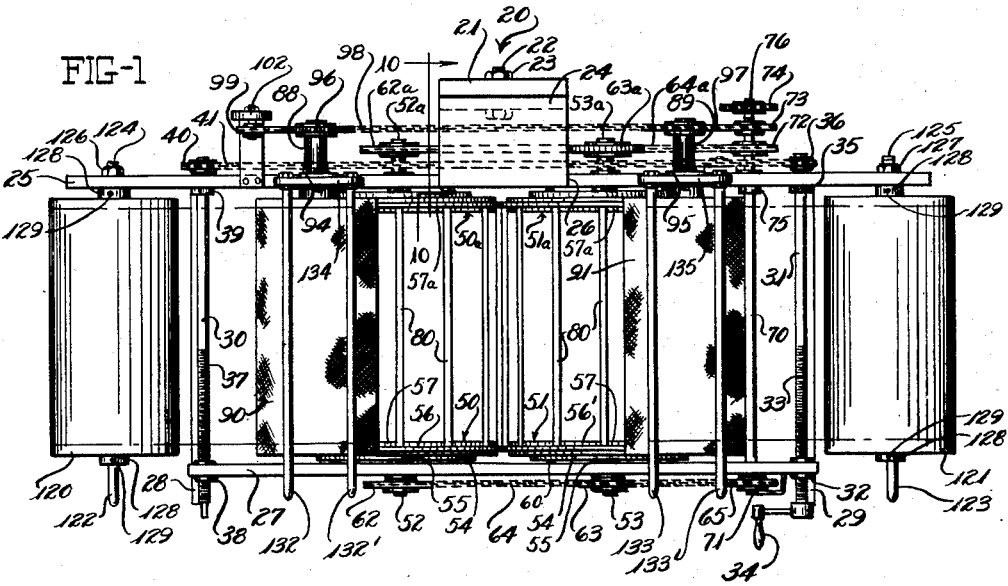
Figure 1 is a top plan view of one form of machine embodying the present invention.

Referring more particularly to the drawings it will be seen that a machine, referred to generally as 20, is pivotally mounted, on a metal column 21, by means of a bolt 22 and nut 23 adapted to clamp a metal angular support 24 which is welded or otherwise attached to a metal side member 25 at 26. A second side member 27 is supported, in laterally movable relation, to member 25, on a pair of support channels 28 and 29 which channels are welded to and project from member 25.

Member 27 is movable to and away from member 25 by means of threaded shafts 30 and 31. Shaft 31 is supported in thread relation in an internally threaded member 32 rigidly attached in side member 27. The threaded portion 33 of shaft 31 projects a distance beyond nut 32 and has mounted at the extreme end thereof a crank handle 34. The opposite end of shaft 31 is supported in a hole, not identified, in member 25 and projects a distance beyond member 25. A collar 35 is fixed by attachment to shaft 31 and in rotatable contact with the lateral inside surface of member 25. A sprocket 36 is attached in keyed relation to the end of shaft 31 which projects from member 25. Shaft 30 has a threaded portion 37 in threaded relation in nut 38 which is rigidly attached in side member 27. The opposite end of shaft 30 is supported in a hole, not identified, in member 25 and projects a distance beyond member 25. A collar 39 is fixedly attached to shaft 30 in rotatable contact with the lateral inside surface of member 25. A sprocket 40 is attached in keyed rotation to shaft 30. A sprocket chain 41 connects sprockets 36 and 40 whereby threaded shafts 30 and 31 are synchronously rotated by means of manually operated crank 34. It will now be seen that member 27 may be moved laterally toward and away from member 25 by the rotation of the shafts 30 and 31 in thread members 28 and 32 respectively. It is to be understood that side members 25 and 27 are disposed in parallel relation, and that the shafts 30 and 31 are adapted to maintain such parallel relation through the widthwise adjustment of such side members.

A pair of driven rotatable cooperating members, referred to generally as 50 and 51, are rotatably supported by side member 27, by means of shafts 52 and 53 respectively, in bearing holes, not identified, in side member 27. Members 50 and 51 are of the same construction and for that reason only one will be described in detail. Member 50 comprises disk 54 having a hub 55 formed integral therewith; disk 56 having off-set portion 57 of reduced diameter, said disk 57 having a succession of spaced cross-member retaining slots 58 to be described hereinafter. Shaft 52 passes through hub 55 and extends into disk 56. Disk 56 is rotatable relative to shaft 52, and hub 55 is fixedly attached to shaft 52. Disk 54 and 56 are relatively adjustable through means of slots 59 and tap screws 60 having heads 61. When screws 60 are loosened disks 54 and 56 may be rotated relative to each other such distance as slots 59 will permit. Said disks 54 and 56 are held in selected positions by tightening screws 60. Disks 54 and 56a are relatively adjustable in the same manner as disks 54 and 56. The purpose of the adjustment of these disks will be explained later herein. Shafts 52 and 53 project laterally outwardly of side member 27 a distance to mount sprockets 62 and 63 respectively. Sprockets 62 and 63 are driven by a chain 64. It will be seen by reference to Figs. 1 and 2 that the peripheries of disks 56 and disk 56¹ are in contact. Chain 64 is driven and in turn drives sprockets 62 and 63 clockwise and counterclockwise respectively. Chain 64 is driven by a sprocket 65 and has tension adjustment means comprising an idler sprocket 66 on shaft 67, said shaft 67 being adjustably held in slotted bracket 69 mounted on or an integral part of side member 27.

Sprocket 65 is slidably mounted on a splined shaft 70 and is retained in relation to side member 27 by a bracket 71, in alignment with sprockets 62 and 63. Bracket 71 may be supported on member 27 by any suitable means as by welding. Shaft 70 is rotatably supported in side members 25 and 27 and projects beyond said side members to receive sprocket 65 on one end and drive sprockets 72, 73 and driven sprocket 74 on its opposite projecting end portion. A collar 75 fixedly attached to and rotatable with shaft 70 is disposed adjacent to the lateral inside surface of side member 25 to prevent longitudinal movement of shaft 70 relative to member 25. Shaft 70 is driven by sprocket 74 by means of drive chain 76 which in turn is driven by means of a motor drive not shown.

A second pair of driven rotatable cooperating members 50a and 51a are rotatably supported by side member 25 on shafts 52a and 53a, respectively, in bearing holes, not identified, in side member 25. Members 50a and 51a are identical to members 50 and 51 respectively, and for that reason it is considered unnecessary to repeat the description of such members. Members 50a and 51a are mounted on shafts 52a and 53a in similar fashion as members 50 and 51 are mounted on their shafts 52 and 53. Shafts 52a and 53a have attached sprockets 62a and 63a such latter sprockets being identical with sprockets 62 and 63. Sprockets 62a and 63a are driven by means of sprocket chain 64a which inturn is driven by sprocket 72. It is to be understood that chain 64a drives members 50a and 51a in the same way, and in snychronism with members 50 and 51. It is also to be understood, as will be seen by reference to the drawings, that members 50a and 51a have the same positions relative to each other as do members 50 and 51. Members 50 and 50a are in axial alignment as are members 51 and 51a. The rotatable adjustment of elements of the members 50 and 51 are so arranged as to axially align slots 58 with the corresponding slots in members 50a and 51a respectively. Said slots in members 50, 50a and 51, 51a receive and retain, in removable relation, cross-members referred to generally as 80. Cross-members 80 comprise a body member 81 preferably composed of rubber or rubber-like material and attachment means 82 having a compressible rib-portion 83 adapted to enter slots 58a and to be removably held therein. It is to be noted (see Fig. 5) that the base portion of the cross-member 80, rests on the shoulder, formed by offset 57, and it is to be noted that the surface 84 of body 81, is shown flush with the peripheral edge of disk 56. It is to be understood that surface 84 will be flush with the peripheral edges of both members 50 and 50a, or members 51 and 51a as the case may be. Applicant has found that when a compressible material is used for body 81 that improved results are obtained by having the face of the body 84 convex in cross section or slightly projecting radially outwardly of said peripheries or both convex and projecting outwardly of the last mentioned peripheries. It is to be further understood that the type of seal of the wrapping material to be made, as will be explained as the description continues, may be varied according to the type of seal required or desired. To this end the face 84 may be cross sectionally concave or the faces 84 may be knurled or designed to any predetermined patterns desired to be impressed on the seal. While rubber or similar material is preferred for the body 81 it could be metal, wood, or other rigid material, but preferably it is composed of a material of a low heat conductivity.

Referring now to Fig. 3 it will be seen that cross members 80 are disposed in slots 58 and 58a with their ends abutting disk 56 and 56a respectively. It will also be seen that members 80 are circumferentially spaced about said disks 56 and 56a at predetermined positions. For most wrapping operations the members 80 will be equally spaced, but may be given any spacing required for the particular wrapping requirement.

The cross members 80 are disposed in rotating members 51 and 51a, in the same manner and same relation as they are in cooperating rotating members 50 and 50a. Members 50, 50a and 51, 51a are adapted to rotate clockwise and counterclockwise respectively, and thus carry the faces 84 of cross members 80 into successive contact relation with each other. Since faces 84 are radially outward of the periphery of the disk 56 such faces, in the case of resilient material, will be in yielding contact. It is to be understood, of course, that if cross members 80 are of rigid material that they will not extend beyond the periphery of disk 56 unless backed by suitable resilient means adapted to permit peripheral contact of the disks so as not to interfere with longitudinal sealing.

A pair of heating rolls referred to generally as 90 and 91 are supported on hollow hubs 88 and 89 projecting therefrom and integral therewith, in bearing 92 and a bearing not shown in brackets 94 and 95 respectively.

Sprockets 96 and 97, mounted at the ends of hubs 88 and 89 respectively, are driven counterclockwise and clockwise respectively, by means of sprocket chain 98. Chain 98 is driven by sprocket 73 mounted on driven shaft 70. Chain 98 also passes around idler sprockets 99 and 100. Sprocket 100 is mounted on a spindle 101 which in turn is mounted on a bracket which extends from bracket 95. Sprocket 99 is adjustably mounted on a T-shaped bracket 102 bolted to frame 25. The T bracket 102 has slot 103 in which a spindle 104, carrying said sprocket 99, is adjustably mounted and here tension on chain 98 is regulated.

Heater roll 90 comprises a removable flanged end plug

105. Two heater elements 106 and 107 are wound on a flat fixed insulator 108 having a tongue 109. Tongue 109 is attached to any suitable bracket, not shown, which bracket may be attached to frame 25. Heating element 106 is attached, on one end, to a line circuit 110, at terminal 111, and at its other end to terminal 112 and thence through thermostat 113, to line terminal 114 which in turn is connected to return line 115. Heater element 107 is connected to terminal 111, at one end and to terminal 114. As indicated above heater 90 is rotated through the medium of sprocket 96. Heater rolls 90 and 91 are of the same construction and are connected to the same source of heating current, and are adapted to heat a wrapping film as said rolls conveys such film to elements 50, 50a and 51, 51a respectively as will be explained as the description continues.

Rolls of wrapping film or material 120 and 121 rotatably are mounted on spindles 122 and 123 respectively, said spindles having threaded end portions 124, 125 respectively, in threaded relation with internally threaded holes, not shown, in member 25. Threaded ends 124 and 125 of the spindles take lock nuts 126 and 127 respectively to hold these spindles in fixed relation with members 25. Collars 128 are adapted to position the rolls 120 and 121 longitudinally of their spindles by means of set screws 120 as will be readily understood.

Figure 9:
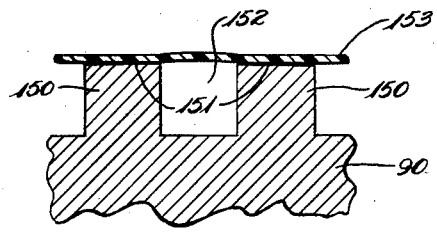
Figure 9 is a fragmentary sectional view of a heater roll illustrating the relative position of a strip of film and the surface of the heated roll as the film passes over the roll in a packaging operation.
Figure 10:
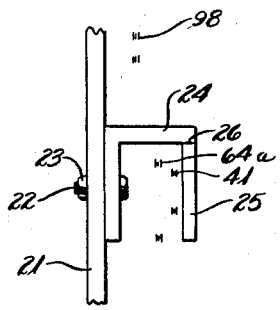
Figure 10 is a view showing a fragment of the machine support with the machine supporting bracket attached in rotatable relation therewith.

Means for controlling the circumferential film-contact area of the heater rolls comprise spindles 132, 132¹ and 133, 133¹ respectively. Spindles 132, 132¹ and 133, 133¹ are fixedly attached to arms 134 and 135 respectively, and may carry idler rolls thereon if desired, which arms are adjustably clamped by means of bolts 136 and 137 respectively to brackets 138 and 139 respectively, which latter mentioned brackets are attached to side member 25 by means such as by welding. Longitudinal slots 140 and 141 permit shifting arms 134 and 135 longitudinally and rotatably relative to bolts 136 and 137 respectively. The outer surface of rolls 90 and 91 intermediate their ends are contoured in knurled or such form as to present numerous projections to film passing over such surfaces in contact therewith. The shape, size and spacing of such projections may be varied according to the requirement of the packing operation. One type of heater roll surface found satisfactory is illustrated in Fig. 9 wherein a thin sheet of wrapping material 153 which may be "Pliofilm," polyethylene, vinyl film or other suitable film. A thin film of the type mentioned, particularly when heated adheres to contacting surfaces and is shown in Fig. 9 as it would appear when being advanced in contact with roll 90. Roll projections 150 have convex wrapping material contact surfaces 151 and define depressions 152 therebetween. While the areas of the contact surfaces 151 may vary it has been found that for best results a contact area of approximately one quarter square inch should not be exceeded. In the illustration of Fig. 9 the roll 90 is heated and it will be noted that the material 153 is in contact with numerous projecting surface 151 at the center thereof only. The air in depressions 152 is at least partially trapped between the roll 90 and material 153. Such trapped air becomes heated and expanded. Obviously the temperature of said trapped air, because of its low conductivity, will impart less heat to the material 153 than will the contacting portions of projections 150. The expansion of the trapped air will exert a pressure against the underside of material 153 preventing adhesion of such material to the surfaces 151. In the case of the smooth surfaced heater rolls of the prior art, there is an unbalanced atmospheric pressure existing on the opposite faces of the wrapping material. When it is in contact with the smooth heated roll, there results a suction-cup like adhesion. Since such wrapping material as indicated above becomes tacky when heated, the smooth surface rolls of the prior art were unsatisfactory due to the difficulty in removal of the film from the heated roll. Before applicant's invention such wrapping material as contemplated here attained uniform temperature over the entire area of the material. It is to be noted that the wrapping material heated on applicant's heater roll attains varying degrees of temperature caused by the design of the heater surface. The areas of lower temperature resist stretching more than do the higher temperature areas and accordingly resist tearing or rupturing more than the hotter softer film areas. The said cooler and stronger areas of film wrapping material follow the pattern of the depressions of the roll and it is thought that the areas of higher temperature, which are softer, more clinging and easier stretched are prevented from rupturing by the adjacent stronger low temperature material. This makes possible the removal of the thin wrapping material from the heater roll at a higher temperature than would otherwise be possible. After the removal of the film from the heater roll the higher temperature portions of the material are lowered by conduction to the lower temperature portions of the material thus resulting in a substantially uniform temperature of film as it progressess toward a wrapping station 160.

Severing means, referred to generally as 161 (see Fig. 6), comprises an actuating device mounted on a plate 159, adjustably attached to column 21, by means of bolts 158, in slots 157. Said device is in the form of an electric solenoid 162 having armature 163. The solenoid 162 is energized by an electric circuit completed by means of contact in microswitch 164 mounted on a curved bracket 165, bolted to column 21, which bracket is circumferentially parallel to the periphery of disk 56. Switch 164 is operated by contact with cross members 80 as they are rotated by disks 56 in a packaging operation. It is understood that microswitch 164 is adjustably clamped to bracket 165 and movable lengthwise circumferentially of this bracket whereby the timing of electric circuit in said solenoid can be closed when cross members 80 are at a predetermined circumferential distance from wrapping station 160.

Armature 163 is pivotably connected to bell crank arms 168 and 169 by link arms 166 and 167 at pivot points 170, 171, and 172. Bell cranks 168 and 169 are pivotally mounted on plate 159 on pins 173 and 174 respectively. Bell crank 168 has a long arm 175 and a short arm 176 and bell crank 169 has long arm 177 and short arm 178. At the end of arms 175 and 177, opposite from pivots 173 and 174 respectively, are mounted severing elements 179 and 180 which may be knives, hot wires or other means found satisfactory. Arms 175 and 177 are provided with lengthwise adjustment means in the form of turn buckles 181 and 182 through which necessary alignment of said severing elements can be made.

Referring now to Figure 7 there is shown a wrapping element 200 in the form of a cylindrical shell having openings 201 adapted to receive articles or material being wrapped. Shell 200 is designated to replace cross members 80, 50, 50a shown in Fig. 3. Shell 200 fits over disk offsets 57 and 57a with its inner end surfaces in contact with offset 57 and 57a and its outer circumferential surface is flush with the peripherial surface of disks 56 and 56a. By the adjustment of side member 27 by means of crank 34, said cylinder is clamped between the disks 56 and 56a and thereby retained in operative position. Similarly a cylinder 200 is substituted for the cross members 80 on 51, 51a the said cylinders being adapted to cooperate in a manner as do said cross members 80. The openings in the cooperating cylinders are so positioned as to register as the cylinders rotate. Any desired pattern of cooperating openings 201 may be incorporated in said cylinders. Cylinders 200 can be of any suitable length as explained relative to the lengths of cross members 80. The approaching edge 202 of holes 201 adjacent an end of cylinder 200 can be utilized to actuate severing mechanism as will be understood from the description hereinabove relative to the cross members 80. Preferably wrapping station cylinders comprise rigid metal bodies covered with layers of rubbers or rubber-like yielding material. The arcuate surface of the cylinders function to anchor the film against slippage on the cylinder surfaces.

While the operation of the machine has been herein described as equipped with the cross members 80, it is to be understood that these members can be omitted and the machine operated to form a continuous tube of any desired length into which elongated objects or material can be inserted. With the said cross members or said wrapping station cylinders omitted the severing means described will be replaced by manual operation.

Operation

Preparatory to performing a packaging or wrapping operation, machine 20 is adjusted or set to accommodate the width of film to be used. The width of film is determined by the size and shape of the articles being wrapped and the appearance of the finished package desired. Said adjustment must also accommodate the size of the articles being wrapped so as to provide sufficient room for the articles to enter the opening of the wrapping station defined by cooperating cross members 80 and their adjoining disks. Rolls of film 120 and 121 referred to hereinabove are mounted as shown in the drawings.

At the outset the film from roll 121 is manually trained over rolls 130¹ and 131¹ thence over heater roll 91 to disks 51 and 51a and cross members 80 into the bite between disks 51, 51a and 50, 50a respectively. The width of the film, in the present illustration, is such that its edges project a slight distance laterally outwardly of the periphery of disk 51 and 51a. The film from roll 120 is passed over members 132, 132, heater roll 90 to disks 50 and 50a and cross members 80 into said bite between disks 50, 50a and 51, 51a, respectively. The film from roll 120 projects laterally a slight distance beyond the edges of disks 50, 50a as explained in connection with disks 51 and 51a. It is to be understood that side member 27 has been adjusted toward or away from side member 25 to the required position by turning crank 34. Cross members 80, of required length, having been placed in the appropriate slots 58 and 58a which have been brought into axial alignment through relative adjustment of disks 50 and 50a as explained hereinabove. The slots of disks 51 and 51a are similarly axially aligned, and circumferentially aligned, so as to bring said cross bars into cooperating position whereby, in conjunction with the said bite of the disks, the wrapping station is formed. With the said heater rolls having proper temperature for the wrapping film being used, the machine 20 is set into automatic operation by said motor as will be understood from the above description of the apparatus.

Figure 8:
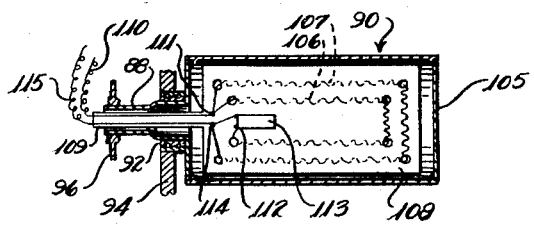
Figure 8 is a diagrammatic view of the wiring of a heater roll shown in Figure 1.

The rotation of disks 50, 50a and 51, 51a draws the film from rolls 120 and 121 forward. Said film passes over heater rolls 90 and 91, which are maintained at said proper temperature, by the means explained relative to Fig. 8. The arrangement is such that the peripheral speeds of the heater rolls, relative to the peripheral speed of disks 50, 50a and 51, 51a, are such that the heat softened film will be subjected to a predetermined longitudinal stretch. The edges of said film slightly projecting laterally outwardly of disks 50, 50a and 51, 51a mentioned hereinabove, turns radially inwardly over the lateral outer edges of said last mentioned disks thus preventing lateral slippage of the film on the peripheries of these disks and thereby providing secure anchorage of the film.

It will now be seen that the strips of film, from rolls 120 and 121, will be conveyed and be pressed into linear sealing contact adjacent their edges and into successive transverse sealing contact between cooperating cross members.

Figure 2:
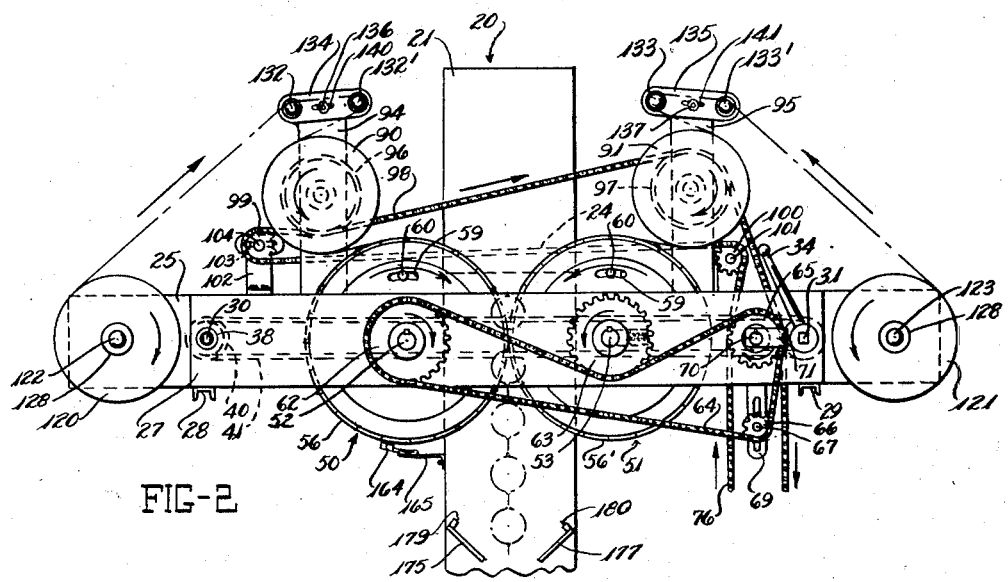
Figure 2 is a side elevation of the machine shown in Figure 1.

As shown diagrammatically in Fig. 2 articles to be packaged are fed, in proper sequence, between the converging sheets of film and the cooperating cross members and disks, as will be understood by those familiar with the stretchwrapping art. The particular arrangement shown in Figs. 1 and 2 are adapted for wrapping cylindrical objects but it is to be understood that a plurality of objects may be wrapped in one package or granular or liquid material could be fed between said films and intermediate said cooperating cross members and disks and thereby packaged.

Severing means 161 is actuated by the contact of the cross members 80 with micro switch control 164 as explained above which means is so adjusted as to cause severing elements 179 and 180 to cut through the film at the sealed portions between the article or articles being packaged. While arms 175 and 177 elements 179 and 180 are shown as being straight, it is to be understood that they can be of any shape to accommodate the shape of the package. While the invention has been illustrated showing means for severing between the individual packages applicant contemplates severing between groups of articles so as to provide a package consisting of any desired number of articles. It is proposed to employ a time delay switch in conjunction with the severing apparatus illustrated to accomplish such group severing. Other means for the same purpose will be apparent to those familiar with the packaging art.

An important feature in operating the present machine is the means provided for angular adjustment of the machine 20 to any desired position relative to its supporting column 21.

The invention is susceptible to numerous modifications other than those specifically described and illustrated, and the right is herein reserved to make such changes as fall within the scope of the appended claims without departing from the spirit of the invention.

I claim:

1. In a machine of the character described comprising a pair of mutually cooperating rotatable wrapping members each having annular film pressing and sealing end members connected by circumferentially spaced film pressing and sealing cross-members defining between these a plurality of openings for at least the partial passage therethrough of articles being wrapped; said end members being provided with closely spaced radial slots relative to the total circumference of said members, said slots being adapted to receive and retain in removable relation the end portions of said cross-members whereby numerous variable circumferential spacings of said cross-members can be made, two laterally spaced parallel frame side members between and on which the corresponding end members of the two wrapping members are respectively mounted, said frame side members being adjustable toward and away from each other in parallel relation by means of threaded synchronously driven propeller shafts for correspondingly adjusting the axial spacing of said end members of both wrapping members to accommodate sets of said cross members of different predetermined lengths; whereby said spacings may be varied both circumferentially and axially of said end members.

2. In a machine of the character described comprising a pair of mutually cooperating rotatable wrapping members each having annular film pressing and sealing end members connected by circumferentially spaced film pressing and sealing cross-members defining between them a plurality of openings, means permitting variation of the circumferential spacing of said cross-members, and means for correspondingly adjusting the axial spacing of said end members of both wrapping members to accommodate sets of said cross-members of different predetermined lengths, whereby said spacings may be varied both circumferentially and axially of said end members.

3. In a machine of the character described comprising a pair of rotatable members each having annular end members connected by circumferentially spaced cross-members defining between them a plurality of openings for at least the partial passage therethrough of articles being wrapped; means for adjusting the axial spacing of said end members comprising two laterally spaced parallel side members between and on which said end members are mounted, said side members being adjustable toward and away from each other in parallel relation by means of threaded synchronously driven propeller shafts whereby said spacings may be varied; a pair of supply rolls adapted to receive rolls of heat-stretchable and heat-sealable thin strips of wrapping material, means for drawing said strips from said rolls through said machine and feeding them in opposite directions onto the peripheries of said end members and thence therebetween; said end members being spaced apart at a distance less than the width of the advancing strips; a pair of heater rollers, one of which is disposed in the course of travel of each of said strips from a said supply roll through the machine; said strips passing from said supply rolls over said heater rollers; the said peripheries of said end members being adapted to restrain the heated strips against lateral displacement, the edges of the heated strips following a path, relative to the peripheries of said end members, which path lies laterally outwardly and radially inwardly of the peripheries of said end members; the peripheral edges of one pair of said end members rotatably contacting the peripheral edges of the corresponding end members of the other pair of end members, whereby said strips are pressed and heat-sealed together adjacent their edges.

4. In a machine of the character described comprising a pair of supply rolls adapted to receive rolls of heat-stretchable and heat-sealable thin strips of wrapping material, means for drawing said strips from said rolls through said machine and feeding them in opposite directions to a wrapping station; a pair of heater rollers, one of which is disposed in the course of travel of each of said strips from a said supply roll through the machine; said strips passing from said supply rolls over said heater rollers, said heater rollers having numerous radial projections on the convex surfaces thereof which define roll surface recesses therebetween, said projections contacting and heating said wrapping material by direct contact therewith, said wrapping material bridging said recesses and being heated thereover by heat transmitted by convection from the heater rollers, whereby said strips have adjoining areas heated to different temperatures.

5. In a machine of the character described comprising a pair of mutually cooperating rotatable wrapping members each having annular film pressing and sealing end members connected by circumferentially spaced film pressing and sealing cross-members defining between said end members and said cross-members a plurality of openings adapted to receive articles or material to be packaged; said end members being provided with a plurality of anchoring means adapted to receive in removable relation the end portions of said cross-members whereby numerous variable circumferential spacings relative to said end members can be made; means for rotatably changing the relative peripheral positions of the end members of each of said pair of rotatable members to vary the operative position of the anchoring means and thus permit adjustment for longitudinal alignment of said cross-members whereby said cross-members can be adjusted into accurate alignment to compensate for wear of said machine in service or inaccurate work or necessary tolerances in the manufacture of said machine.

6. Packaging apparatus having a wrapping station and comprising in combination, means for advancing a sheet of heat-stretchable material to the wrapping station, means for heating the sheet in its advance and for simultaneously stretching it linearly to increase its area before it reaches the wrapping station, said heating means comprising a heated roller having an irregular surface formed with a plurality of radial projections, the radial outer surfaces of which make direct contact with the advancing sheet, means for operating said contacting surfaces at a peripheral speed greater than the linear speed of travel of the advancing sheet, and means for manipulating the heated and stretched advancing sheet at the wrapping station to enclose the article to be wrapped.

7. In a machine for wrapping objects in heat-stretchable and heat-sealable material, the combination of a wrapping station, a pair of supply rolls, means for drawing strips of material from said rolls and feeding them in opposed relation to each other through the machine, said means being arranged to permit the articles one after another to be placed between the strips as the latter are fed along, means for heating the strips progressively and concurrently in advance of the wrapping station to impart to them the requisite stretchable and sealable properties, said heating means comprising a pair of heated rollers having numerous raised projections on the surface thereof whereby said material heated thereon varies in temperature in areas corresponding to said projections and the surface depressions therebetween, and means adapted to press and seal portions of said strips together about said objects to form individual packages.

8. Packaging apparatus having a wrapping station and comprising means for advancing opposed strips of heat-stretchable and heat-sealable material to the wrapping station, a pair of mutually cooperating wrapping members between which the heated strips are fed for the wrapping operation, and means for heating the strips to render them sufficiently stretchable and sealable before reaching the wrapping members, said heating means including a pair of heating rollers having numerous projections about their convex surfaces, said projections defining depressions therebetween.

9. In a machine of the class described comprising, a pair of rotatable members each having annular end members connected by circumferentially spaced cross-members defining between them a plurality of openings for at least the partial passage therethrough of articles being wrapped, said end members being provided with closely spaced radial slots relative to the total circumference of said end members, said slots being adapted to receive and retain in removable relation the end portions of said cross-members whereby numerous variable circumferential spacings of said cross-members may be made; means for adjusting the axial spacing of said end members to accommodate sets of said cross-members of different lengths; two laterally spaced parallel side members between and on which said end members are mounted, said side members being adjustable toward and away from each other in parallel relation by means of threaded synchronously driven propeller shafts whereby said spacings may be varied both circumferentially and axially of said end members; a pair of supply rolls adapted to receive rolls of heat-stretchable and heat-sealable thin strips of wrapping material, means for drawing said strips from said rolls through said machine and feeding them in opposite directions onto the peripheries of said end members and thence therebetween; a pair of heater rollers, one of which is disposed in the course of travel of each of said strips from a said supply roll through the machine; two pairs of idler rollers mounted in pivoted frames, said strips passing from said supply rolls over said pairs of idler rollers, thence onto said heater rollers, said pivoted frame being adapted to lead said strips to said heater rollers so as to vary the arcuate extent of the surface of the heater rollers contacted by said strips, said heater rollers having numerous radial projections on the convex surfaces thereof; means for driving said heater rollers at a surface speed slower than the peripheral speed of said end members whereby said strips of heat-stretchable material is given a predetermined longitudinal stretch, said end members being adapted to receive and restrain against lateral displacement the edges of the heated strips, with the edges of said strips following a path relative to the peripheries of said end members which path lies laterally outwardly and radially inwardly of the peripheries of said end members; the peripheral edges of one pair of said end members rotatably contacting the peripheral edges of the corresponding end members of the other pair of end members, whereby said strips are pressed and heat-sealed together adjacent their edges; said cross-members being so disposed in said end members that corresponding cross-members of each pair of end members come into contact as the end members rotate whereby the said strips are pressed together at successive longitudinal intervals thereof and heat-sealed between said cross-members, whereby an uninterrupted seal of the wrapping material is made; all said aforementioned means being so arranged as to permit articles being wrapped to be placed one after another between said strips as the later are fed along, said articles entering said spaces in said rotatable members whereby said articles are non-adhesively covered by said wrapping material; and strip severing means comprising cutting elements adapted to cut through the transverse sealed area of the strips between the objects covered, said cutting elements being actuated through the medium of a selonoid which in turn is energized by electrical current connected thereto at predetermined intervals by means of a switch which switch is closed by its contact with said rotatable member at circumferentially spaced positions thereon, said machine having a support member with a said side member angularly adjustably attached to said support by means of a suitable clamp whereby the operational position of the machine can be changed relative to its support.

10. A machine of the character described comprising a pair of elongated parallel frame side members adjustable toward or away from each other, means for effecting such adjustment, a pair of rotatable disks rotatably mounted on each side member, each said disk being in axial alignment with its corresponding disk mounted on the opposite side member, said axially aligned disks being adapted to receive and support intermediate thereof in rotatable relation therewith one of a pair of wrapping members of substantially cylindrical shape and of different predetermined lengths, said wrapping members having rotatable contacting surfaces, said surfaces being interrupted by cooperating openings in said wrapping members, said openings being adapted to receive an article being wrapped.

11. In a machine for wrapping objects in heat-stretchable and heat-sealable material, the combination of a pair of supply rolls, means for drawing strips of material from said rolls and feeding them to the wrapping station, and means for subjecting small adjacent areas of said strips to different degrees of temperature before the strips reach the wrapping station.

12. In a machine for wrapping objects in heat-stretchable and heat-sealable material, the combination of a pair of supply rolls, means for drawing strips of material from said rolls and feeding them to the wrapping station, and means for subjecting small adjacent areas of said strips to different degrees of temperature before the strips reach the wrapping station, said heating means being arranged far enough in advance of the wrapping station to allow the heated areas of the strips to acquire a substantially equal temperature before the wrapping operation takes place.

13. In a machine for wrapping objects in heat-stretchable and heat-sealable material, the combination of a pair of supply rolls, means for drawing strips of material from said rolls and feeding them to the wrapping station, and means for subjecting a plurality of localized areas of said strips to different degrees of temperature before the strips reach the wrapping station.

14. In a wrapping machine, the combination of means for advancing a strip of heat-stretchable material to the wrapping station, means for heating the strip progressively in its advance, and a rotatable wrapping member over which the heated strip passes to the wrapping station and which has a peripheral speed greater than the linear speed of travel of the advancing strip, said wrapping member comprising a pair of annular end plates which make peripheral surface contact with the heated strip, and said end plates being spaced apart at a distance less than the width of the advancing heated strip such that the opposite edges of the heated strip will extend laterally beyond the outer faces of the end plates and will turn radially inward of the peripheral surfaces of said plates to prevent lateral slippage of the strip during the wrapping operation.

15. In a machine for wrapping objects in heat-stretchable and heat-sealable material, the combination of a wrapping station, a pair of supply rolls, means for drawing strips of material from said rolls and feeding them in opposed relation to each other through the machine, said means being arranged to permit the articles one after another to be placed between the strips as the latter are fed along, means for heating the strips progressively and concurrently in advance of the wrapping station to impart to them the requisite stretchable and sealable properties, and a pair of mutually cooperating rotatable wrapping members over which the heated strips pass to the wrapping station, said wrapping members presenting annular end peripheral surfaces which contact the heated strips and press and seal them together in the zones of contact, said end peripheral surfaces of the respective wrapping members being spaced apart a distance less than the width of the advancing heated strips such that the opposite edges of the heated strips will extend laterally beyond the zones of contact and will turn radially inward of the peripheral end surfaces of the wrapping members so as thus to prevent lateral slippage of the strips during the wrapping operation.

16. In a machine of the character described, the combination of a pair of mutually cooperating rotatable wrapping members, each comprising a pair of annular film pressing and sealing end plates connected by a series of circumferentially spaced film pressing and sealing cross-members, two laterally spaced parallel frame members between and on which said wrapping members are rotatably mounted, the two corresponding end plates of the rotatable wrapping members being mounted on one frame member and the opposite two corresponding end plates mounted on the other frame member, and means for adjusting the frame members toward and from each other to vary the axial spacing of the end plates of the respective wrapping members for films of different widths.

17. A combination according to claim 16, wherein the cross-members in one adjusted position of the end plates are removable and replaceable by cross-members of a different length in another adjusted position of the end plates.

18. A combination according to claim 16, wherein the film pressing and sealing surfaces of the end plates and the film pressing and sealing surfaces of the cross-members are circumferentially flush with one another, or substantially so.

19. A combination according to claim 16, wherein the cross-members are removable and replaceable by a film pressing and sealing cylindrical shell which is made to seat removably upon the end plates.

References Cited in the file of this patent

UNITED STATES PATENTS

| | | |
|---|---|---|
| 2,152,101 | Scherer | Mar. 28, 1939 |
| 2,185,755 | Hogdon | May 16, 1939 |
| 2,257,576 | Robinson | Sept. 30, 1941 |
| 2,312,049 | Pfeiffer | Feb. 23, 1943 |
| 2,331,762 | Brown | Oct. 12, 1943 |
| 2,374,504 | Salfisberg | Apr. 24, 1945 |
| 2,486,762 | Pfeiffer | Nov. 1, 1949 |
| 2,514,028 | Cloud | July 4, 1950 |